United States Patent
Enomoto (12)

(10) Patent No.: US 6,510,975 B2
(45) Date of Patent: Jan. 28, 2003

(54) FRICTION AGITATION JOINING TOOL AND FRICTION AGITATION JOINING METHOD USING THE SAME

(75) Inventor: Masatoshi Enomoto, Tochigi (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/867,114

(22) Filed: May 29, 2001

(65) Prior Publication Data
US 2002/0011510 A1 Jan. 31, 2002

(30) Foreign Application Priority Data
May 31, 2000 (JP) .................................... 2000-161528

(51) Int. Cl.$^7$ .............................................. B23K 20/12
(52) U.S. Cl. ..................................... 228/112.1; 228/2.1
(58) Field of Search ................................ 228/112.1, 2.1

(56) References Cited

U.S. PATENT DOCUMENTS

| | | | | | |
|---|---|---|---|---|---|
| 5,460,317 | A | * | 10/1995 | Thomas et al. | 228/112.1 |
| 5,718,366 | A | * | 2/1998 | Colligan | 156/580 |
| 5,794,835 | A | * | 8/1998 | Colligan et al. | 228/13 |
| 6,029,879 | A | * | 2/2000 | Cocks | 228/106 |
| 6,053,391 | A | * | 4/2000 | Heideman et al. | 228/112.1 |
| 6,138,895 | A | * | 10/2000 | Oelgoetz et al. | 228/112.1 |
| 6,206,268 | B1 | * | 3/2001 | Mahoney | 228/112.1 |
| 6,227,430 | B1 | * | 5/2001 | Rosen et al. | 156/73.5 |
| 6,299,050 | B1 | * | 10/2001 | Okamura et al. | 156/73.5 |
| 6,325,273 | B1 | * | 12/2001 | Boon et al. | 228/112.1 |
| 6,421,578 | B1 | * | 7/2002 | Adams et al. | 700/212 |

FOREIGN PATENT DOCUMENTS

| | | | |
|---|---|---|---|
| EP | 1160044 A2 | * | 12/2001 |
| GB | 2306366 A | * | 5/1997 |
| GB | WO 99/52669 | * | 10/1999 |
| JP | 02000246465 A | * | 9/2000 |
| JP | 02002035964 A | * | 2/2002 |
| JP | 02002096183 A | * | 4/2002 |
| WO | WO 01/17721 A1 | * | 3/2001 |

OTHER PUBLICATIONS

US 2002/0014516A1 Nelson et al. (Feb. 7, 2002).*
US 2002/0011510A1 Enomoto et al. (Jan. 31, 2002).*
US 2001/0004989A1 Ezumi et al. (Jun. 28, 2001).*

* cited by examiner

*Primary Examiner*—Tom Dunn
*Assistant Examiner*—Kiley Stoner

(57) ABSTRACT

The joining tool according to the present invention is provided with a rotor and a probe having a diameter smaller than a diameter of the rotor. The probe is protruded from a part of an end face of the rotor. A groove is formed at least on a middle portion of a peripheral surface of the probe so as to extend in the axial direction of the probe. The probe is provided with an agitating protrusion formed only on a region of from the basal end portion of the probe to a longitudinal middle portion. In a friction agitation joining method according to the present invention, the rotating probe of the aforementioned joining tool inserted into stacked joining members such that the groove crosses a superposed interface between the joining members and that the protrusion is buried only in one of the joining members located at a probe basal end side. While keeping this state, the probe is moved relative to the joining members to thereby join the joining members.

22 Claims, 6 Drawing Sheets

FRICTION AGITATION JOINING TOOL AND FRICTION AGITATION JOINING METHOD USING THE SAME

BACKGROUND OF THE INVENTION

1. Field of the Invention

The present invention relates to a friction agitation joining tool used for welding joining members made of metal such as aluminum or its alloy, and also relates to a friction agitation joining method using the aforementioned joining tool.

2. Description of Related Art

A friction agitation joining method is classified into a solid-phase welding method, and has advantages such that the method can be applied to any kinds of metallic materials and that the method causes fewer thermal strain due to joining. Thus, recently, the friction agitation joining method is used at various assembling sites of structures, such as vessels, automobiles, railroad cars and panel structures.

FIG. 5 shows two plate-shaped metal joining members which are being butt-joined by a friction agitation joining method.

In FIG. 5, the reference numerals 101 and 102 denote plate-shaped metal joining members. Both the joining members 101 and 102 have the same thickness, and are disposed in a butted state. The reference numeral 110 denotes a friction agitation joining tool. The joining tool 110 is equipped with a column-shaped rotor 111 and a pin-shaped probe 112 having a diameter smaller than a diameter of the probe. The pin-shaped probe 112 is projected from a part of the end face 111a of the rotor 111. In order to efficiently agitate and mix the materials of both the joining members 101 and 102 to soften by frictional heat, agitating projections (not shown) are formed on the peripheral surface of the entire length of the probe 112.

When joining both the joining members 101 and 102 in a butted state with the aforementioned joining tool 110, the probe 112 is rotated in accordance with the rotation of the rotor 111. Then, the rotating probe 112 is inserted into the butted portion 103 of both the joining members 101 and 102, and the end face 111a of the rotating rotor 111 is forced to be pressed on the surface of both the joining members 101 and 102. While keeping this state, the probe 112 is advanced relative to both the joining members 101 and 102 along the butted portion 103.

As a result, a portion of both the joining members 101 and 102 where the probe 112 contacts and its vicinity will be softened by the frictional heat generated due to the rotation of the probe 112 and the contact between the end face 111a of the rotor 111 and the surface of the joining members 101 and 102. In accordance with the advancing movement of the probe 112, the softened and agitated materials of the joining members 101 and 102 are plastically fulidized to go around the probe 112 and to fill up a groove formed behind the probe 112 as it moves. Then, the materials will be cooled and solidified by the immediate loss of such friction heat. This phenomenon will be repeated with the advancing movement of the probe 112, which causes the joining members 101 and 102 to be integrally joined along the entire length of the butted portion 103. The reference numeral 109 denotes the joined portion of the joining members 101 and 102.

FIG. 6 shows the stacked two joining members joined by the aforementioned joining tool 110.

In FIG. 6, the reference numerals 105 and 106 denote plate-shaped metal joining members, respectively. Both joining members 105 and 106 are stacked one on top of the other. The reference numeral 107 denotes the superposed interface of the joining members 105 and 106.

When both the joining members 105 and 106 are joined in a stacked state with the aforementioned joining tool 110, the following problems will arise.

As mentioned above, the probe 112 is provided with the aforementioned agitating protrusions on the peripheral surface of the entire length thereof. When the rotating probe 112 is inserted into both the joining members 105 and 106 from the upper surface of the upper joining member 105, the materials of the upper and lower joining members 105 and 106 softened by the frictional heat will be stirred up by the agitating protrusions. Thereby, the upper surface of the upper joining member 105 swells. On the other hand, the upper surface of the upper joining member 105 is pressed down by the end face 111a of the rotor 111 to be flattened. Consequently, the thickness of the joined portion 109 of the upper joining member 105 and its vicinity decreases. This deteriorates the strength of the joined members.

Furthermore, since natural-oxidation films 105a and 106a are usually formed in the superposed interface of the joining member 105 and 106 as shown in FIG. 7A, the natural-oxidation films 105a and 106a will be stirred up by the agitating protrusions at the time of joining. Thus, as shown in FIG. 7B, the natural-oxidation films near the joined portion 109 will be raised. This causes an easy generation of fatigue cracks, resulting in a deterioration of fatigue strength of the obtained stacked joint.

SUMMARY OF INVENTION

The object of the present invention is to provide a friction agitation joining tool which can prevent a deterioration of strength of the joined members, such as a deterioration of joined strength and fatigue strength, to obtain a joined member having strength reliability, and also to provide a friction agitation joining method using such a joining tool.

Other purpose of the present invention will become apparent from the following embodiments.

According to a first aspect of the present invention, a friction agitation joining tool includes a rotor and a probe to be inserted into joining members, wherein the probe has a diameter smaller than a diameter of the rotor and is provided at a part of an end surface of the rotor, wherein the probe is provided with a groove formed on a peripheral surface of at least a longitudinal middle portion of the probe, the groove extending in an axial direction of the probe.

With this joining tool, at the time of joining, the probe is inserted into two pieces of metal joining members stacked one on top of the other such that the probe crosses both of the joining members. Thereby, the groove is disposed generally perpendicular to the superposed interface of the stacked joining members. For this reason, the natural-oxidation films formed on the superposed interface of each joining member will be ground minutely with the edge of the groove. Consequently, the standup of the natural-oxidation film which may occur near the joined portion will be suppressed, which enhances the fatigue strength of the obtained stacked joint.

In the aforementioned groove, it is preferable that the groove is formed such that a width of the groove becomes gradually narrow toward a basal end of the probe. With this preferred embodiment, it is possible to minimize the phenomenon that the materials of the joining members entered in the groove is conveyed outside the joining members through the groove during joining. This can prevent a deterioration of joining strength due to shortage of materials.

Furthermore, in the aforementioned preferred embodiment, it is preferable to set a width W of the groove so as to satisfy the following inequality:

$$5/100 \leq (W1-W2)/(2t0) \leq 15/100,$$

where W1 is a width of one end of the groove at a tip end side of the probe, W2 is a width of the other end of the groove at a basal end side of the probe, and t0 is a total thickness of joining members. By setting the width W as mentioned above, it becomes possible to assuredly prevent a deterioration of the joining strength due to shortage of materials.

In the aforementioned joining tool according to the first aspect of the present invention, it is preferable to set a width W of the groove so as to satisfy the following inequality:

$$1/20 \leq W/D2 \leq 1/8,$$

where D2 is a diameter of the probe. This enables the natural-oxidation film to be completely ground into fine particles.

In the aforementioned joining tool according to the first aspect of the present invention, it is preferable to set a depth H of the groove so as to satisfy the following inequality:

$$0.5 \leq H/W \leq 1.5,$$

where W is a width of the groove. This enables the natural-oxidation film to be completely ground into fine particles.

According to a second aspect of the present invention, a friction agitation joining tool includes a rotor, a probe to be inserted into joining members, wherein the probe has a diameter smaller than a diameter of the rotor and is provided at a part of an end surface of the rotor, and an agitating protrusion provided on a peripheral surface of the probe only in a region of from a basal end portion of the probe to a longitudinal middle portion of the probe.

With this joining tool according to the second aspect of the present invention, the probe is inserted into both the joining members stacked one on top of the other such that the probe crosses the two joining members, in the same manner as in the first aspect of the present invention. Furthermore, the end face of the rotor presses the outer surface of one of the joining members located at the basal end side of the probe. In this probe insertion state, since the agitating protrusion is provided only in the range of from the basal end portion of the probe to a longitudinal middle portion thereof, the protrusion is buried only in one of the joining members located at the basal end side of the probe, and is not buried in the other joining member located at the tip end side of the probe. Consequently, it is prevented that materials of the joining member located at the tip end side of the probe is stirred up by the agitating protrusion. Thus, the swelling of the outer surface of the joining member located at the basal end side of the probe can be decreased. Accordingly, the deterioration of the joining strength due to the decreased thickness of the joining member located at the basal end side of the probe can be prevented.

In the aforementioned joining tool according to the second aspect of the present invention, it is preferable that the protrusion extends in a helical fashion. With this joining tool, the materials of the joining members softened by frictional heat can be agitated efficiently.

According to a third aspect of the present invention, a friction agitation joining tool includes a rotor and a probe to be inserted into joining members, wherein the probe has a diameter smaller than a diameter of the rotor and is provided at a part of an end surface of the rotor, wherein the probe is provided with a groove extending in an axial direction of the probe on a peripheral surface of at least longitudinal middle portion of the probe, and wherein the probe is provided with an agitating protrusion on a peripheral surface of the probe only in a region of from a basal end portion of the probe to a longitudinal middle portion of the probe.

With this joining tool according to the third aspect of the present invention, the same function as that of the joining tool according to the first aspect of the present invention and the same function as that of the joining tool according to the second aspect of the present invention can be obtained simultaneously.

In the joining tool according to the third aspect of the present invention, it is preferable that the groove is formed such that a width of the groove becomes gradually narrow toward the basal end portion of the probe because of the aforementioned reasons.

In this joining tool, it is also preferable to set the width W of the groove so as to satisfy the following inequality:

$$5/100 \leq (W1-W2)/(2t0) \leq 15/100,$$

where W1 is a width of one end of the groove at a tip end side of the probe, W2 is a width of the other end of the groove at a basal end side of the probe, and t0 is a total thickness of joining members, because of the same reasons as mentioned above.

In the joining tool according to the third aspect of the present invention, it is preferable to set the width W of the groove so as to satisfy the following inequality:

$$1/20 \leq W/D2 \leq 1/8,$$

where D2 is a diameter of the probe, because of the same reasons as mentioned above.

In the joining tool according to the third aspect of the present invention, it is preferable to set the depth H of the groove so as to satisfy the following inequality:

$$0.5 \leq H/W \leq 1.5,$$

where W is a width of the groove, because of the same reasons as mentioned above.

In the joining tool according to the third aspect of the present invention, it is preferable that the protrusion extends in a helical fashion.

According to a fourth aspect of the present invention, a friction agitation joining tool includes a rotor and a probe to be inserted into joining members, wherein the probe has a diameter smaller than a diameter of the rotor and is provided at a part of an end surface of the rotor, wherein the probe includes a first shaft portion and a second shaft portion having a diameter smaller than a diameter of the first shaft portion, the first shaft portion constituting a region of from a basal end portion of the probe to a longitudinal middle portion of the probe, the second shaft portion constituting a region of from the longitudinal middle portion to a tip end portion of the probe, wherein the probe is provided with a groove extending in an axial direction of the probe on a peripheral surface of at least the longitudinal middle portion, and wherein the probe is provided with an agitating protrusion only on a peripheral surface of the first shaft portion.

With this joining tool according to the fourth aspect of the present invention, the same function as that of the joining tool according to the first aspect of the present invention and the same function as that of the joining tool according to the second aspect of the invention can be obtained simultaneously. Furthermore, a stepped portion formed between the first shaft portion and the second shaft portion presses the portion of the joining members softened by friction heat. Consequently, the materials of the joining members can be agitated much more effectively, resulting in a good joined portion.

In the fourth aspect of the present invention, it is preferable that the groove is formed such that a width of the groove becomes gradually narrow toward the basal end portion of the probe, because of the same reasons as mentioned above.

Furthermore, in this joining tool, it is preferable to set the width W of the groove so as to satisfy the following inequality:

$$5/100 \leq (W1-W2)/(2t0) \leq 15/100,$$

where W1 is a width of one end of the groove at a tip end side of the probe, W2 is a width of the other end of the groove at a basal end side of the probe, and t0 is a total thickness of joining members, because of the same reasons as mentioned above.

In the fourth aspect of the present invention, it is preferable to set the width W of the groove so as to satisfy the following inequality:

$$1/20 \leq W/D2 \leq 1/8,$$

where D2 is a diameter of the probe, because of the same reasons as mentioned above. Furthermore, it is preferable to set the depth H of the groove so as to satisfy the following inequality:

$$0.5 \leq H/W \leq 1.5,$$

where W is a width of the groove.

In the fourth aspect of the present invention, it is preferable that the protrusion extends in a helical fashion, because of the same reasons as mentioned above.

In the fourth aspect of the present invention, it is preferable that a peripheral surface of the first shaft portion and that of the second shaft portion are connected via a tapered surface. With this joining tool, the first shaft portion can be inserted into the joining members smoothly and easily.

Furthermore, in this joining tool, it is preferable that a taper angle of the tapered surface relative to an axis of the probe falls within the range of from 20° to 30°. With this joining tool, the first shaft portion can be inserted into the joining members more smoothly and easily.

According to a fifth aspect of the present invention, a friction agitation joining method for joining stacked two joining members includes the steps of: preparing a friction agitation joining tool comprising a rotor and a probe to be inserted into the joining members, wherein the probe has a diameter smaller than a diameter of the rotor and is provided at a part of an end surface of the rotor, wherein the probe is provided with a groove formed on a peripheral surface of at least a longitudinal middle portion of the probe, the groove extending in an axial direction of the probe; inserting the rotating probe into the stacked two joining members such that the groove crosses a superposed interface of the joining members; and moving the rotating probe relative to the joining members with the rotating probe inserted in the joining members to thereby join the joining members.

With this fifth aspect of the present invention, by inserting the rotating probe into the stacked two joining members, the groove comes to, approximately perpendicularly cross the superposed interface of the joining members. Then, by moving the probe relative to the joining members while keeping the insertion state, the natural-oxidation film formed in the superposed interface will be ground minutely with this movement the probe. Consequently, the standup of the natural-oxidation film which may cause near the joined portion will be suppressed, resulting in an enhanced fatigue strength of the stacked joint.

According to a sixth aspect of the present invention, a friction agitation joining method for joining stacked two joining members, the method including the steps of: preparing a friction agitation joining tool which comprises a rotor, a probe to be inserted into the joining members, the probe having a diameter smaller than a diameter of the rotor and being provided at a part of an end surface of the rotor, and an agitating protrusion provided on a peripheral surface of the probe only in a region of from a basal end portion of the probe to a longitudinal middle portion of the probe; inserting the rotating probe into the stacked two joining members such that the protrusion is buried only in one of the joining members located at the basal end portion side of the probe; and moving the rotating probe relative to the joining members with the rotating probe inserted in the joining members to thereby join the joining members.

With this sixth aspect of the present invention, since the agitating protrusion is buried only in one of the joining members located at the basal end portion side of the probe and is not buried in the other of the joining members located at the tip end portion side of the probe, it is prevented the materials at the tip end portion side of the probe from being stirred up by the protrusion. This decreases the swell of the outer surface of the joining member located at the basal end side of the probe. Accordingly, the deterioration of the joint strength due to the decreased thickness of the joining member at the probe basal end side can be suppressed.

According to a seventh aspect of the present invention, a friction agitation joining method for joining stacked two joining members, includes the steps of: preparing a friction agitation joining tool which comprises a rotor and a probe to be inserted into joining members, wherein the probe has a diameter smaller than a diameter of the rotor and is provided at a part of an end surface of the rotor, wherein the probe is provided with a groove extending in an axial direction of the probe on a peripheral surface of at least longitudinal middle portion of the probe, and wherein the probe is provided with an agitating protrusion on a peripheral surface of the probe only in a region of from a basal end portion to a longitudinal middle portion of the probe; inserting the rotating probe into the stacked two joining members such that the groove crosses a superposed interface of the joining members and that the protrusion is buried only in one of the joining members located at the basal end portion side of the probe; and moving the probe relative to the joining members with the rotating probe inserted in the joining members to thereby join the joining members.

With this joining method according to the seventh aspect of the present invention, the same function as that of the joining method according to the fifth aspect of the present invention and the same function as that of the joining method according to the sixth aspect of the invention can be obtained simultaneously.

According to an eighth aspect of the present invention, a friction agitation joining method for joining stacked two joining members, includes the steps of: preparing a friction agitation joining tool which comprises a rotor and a probe to be inserted into joining members, wherein the probe has a diameter smaller than a diameter of the rotor and is provided at a part of an end surface of the rotor, wherein the probe includes a first shaft portion and a second shaft portion having a diameter smaller than a diameter of the first shaft portion, the first shaft portion constituting a region of from a basal end portion of the probe to a longitudinal middle portion of the probe, the second shaft portion constituting a region of from the longitudinal middle portion to a tip end portion of the probe, wherein the probe is provided with a groove extending in an axial direction of the probe on a peripheral surface of at least the longitudinal middle portion, and wherein the probe is provided with an agitating protrusion only on a peripheral surface of the first shaft portion; inserting the rotating probe into the stacked two joining members such that the groove crosses a superposed interface of the joining members and that the protrusion is buried only in one of the joining members located at the basal end portion side of the probe; and moving the probe relative to the joining members with the rotating probe inserted in the joining members to thereby join the joining members.

With this joining method according to the eighth aspect of the present invention, the same function as that of the joining method according to the fifth aspect of the present invention and the same function as that of the joining method according to the sixth aspect of the invention can be obtained simultaneously. Furthermore, the stepped portion formed between the first shaft portion and the second shaft portion presses the portion of the joining members softened by the friction heat. As a result, the materials of the joining members can be more effectively agitated, resulting in a good joined portion.

BRIEF DESCRIPTION OF THE DRAWINGS

The aforementioned purposes and another purposes, features and advantages of the present invention will be more fully described and better understood from the following description, taken with the appended drawings, in which.

DETAILED DESCRIPTION OF THE PREFERRED EMBODIMENTS

Next, the preferable embodiment of the present invention will be explained with reference to the drawings.

Figure 1:
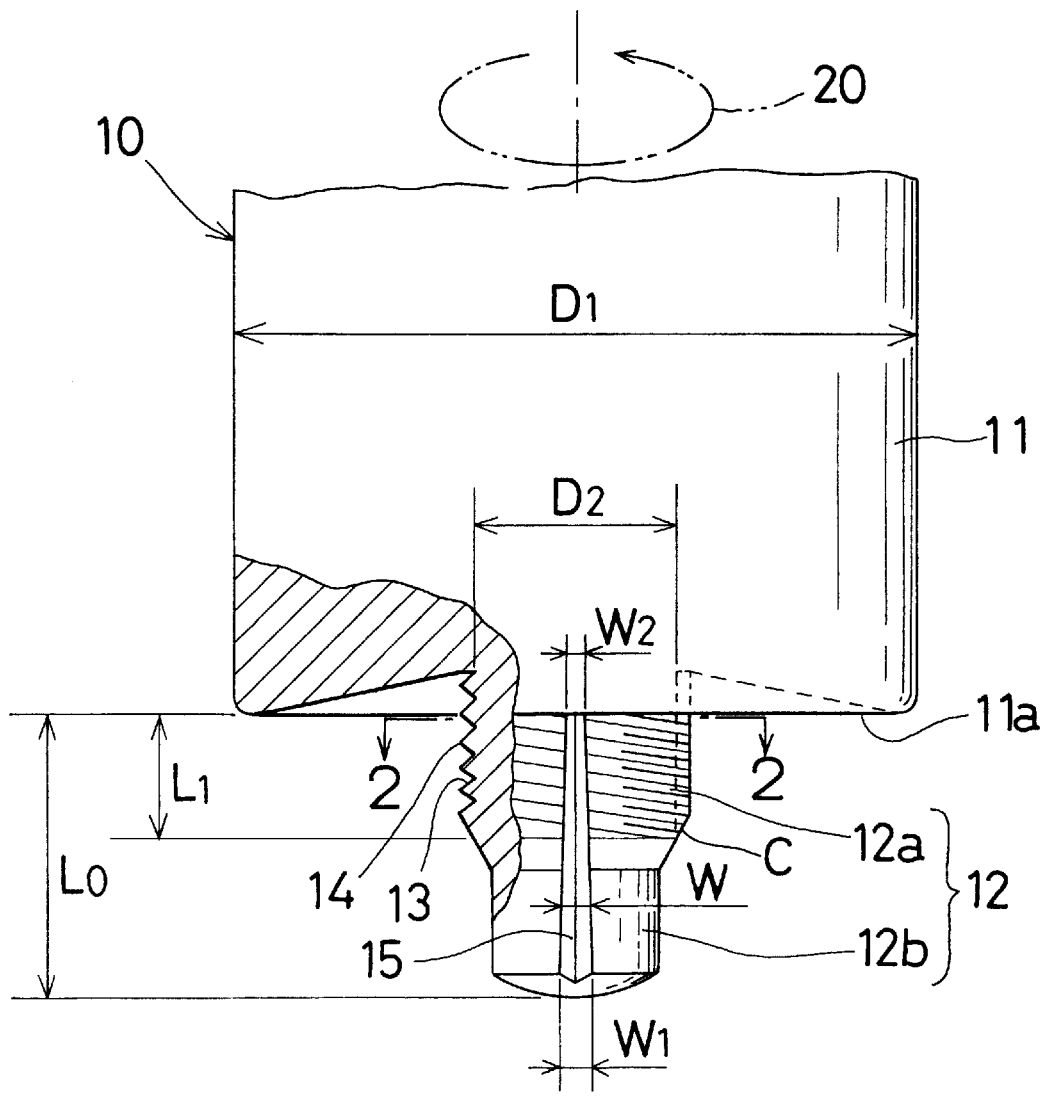
FIG. 1 is a partially broken side view of the principal part of the friction agitation joining tool of the embodiment according to the present invention.
Figure 2:
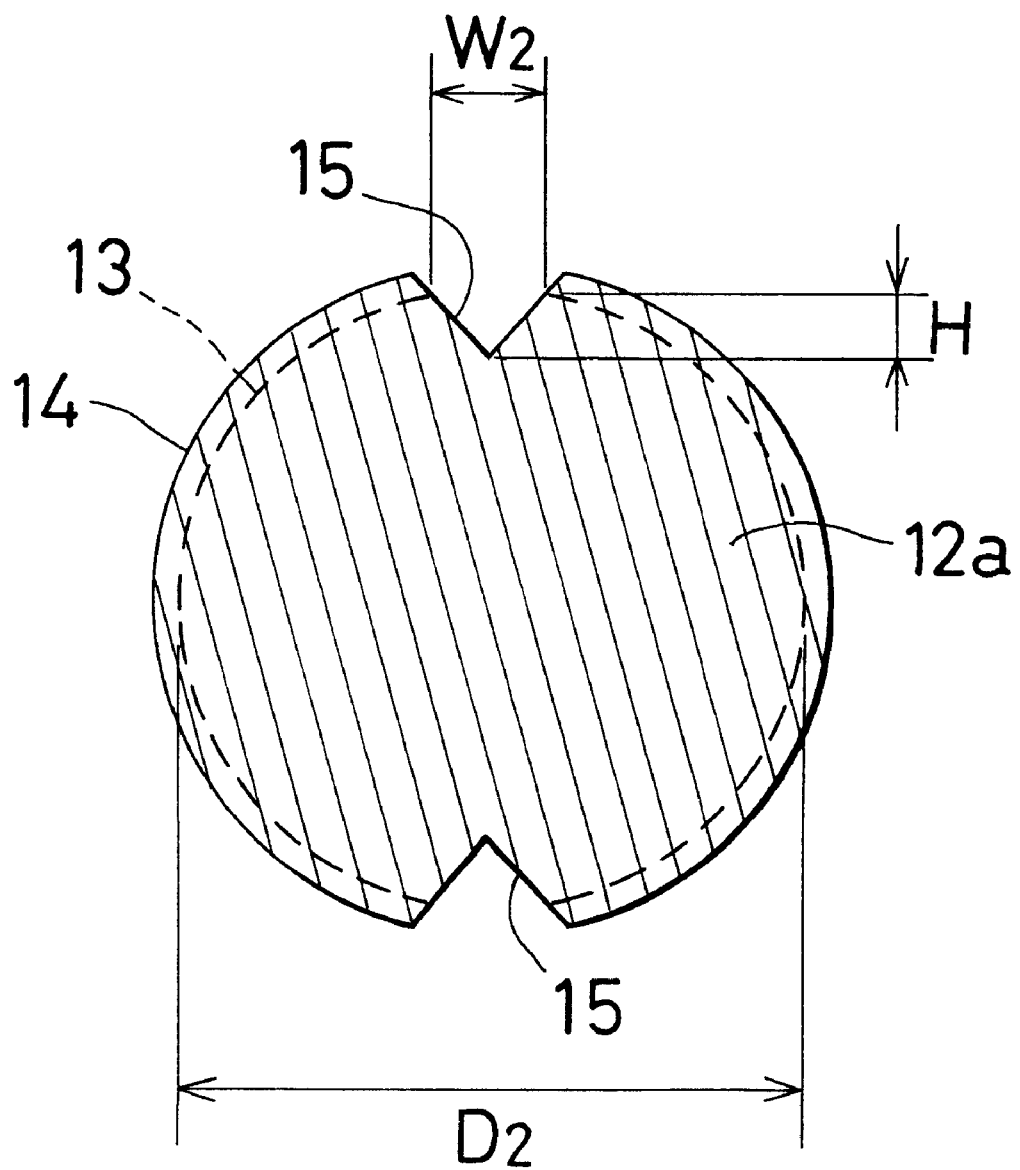
FIG. 2 is an enlarged cross-sectional view taken along the line 2—2 in FIG. 1.

In FIG. 1, the reference numeral 10 denotes a friction agitation joining tool according to this embodiment. This joining tool 10 is equipped with a column-shaped rotor 11 and a pin-shaped probe 12 having a diameter smaller than the diameter of the rotor 11. The probe 12 is projected from the rotation center of the end face 11a of the rotor 11 along the rotation axis thereof. The rotor 11 and the probe 12 rotate integrally.

Figure 3:
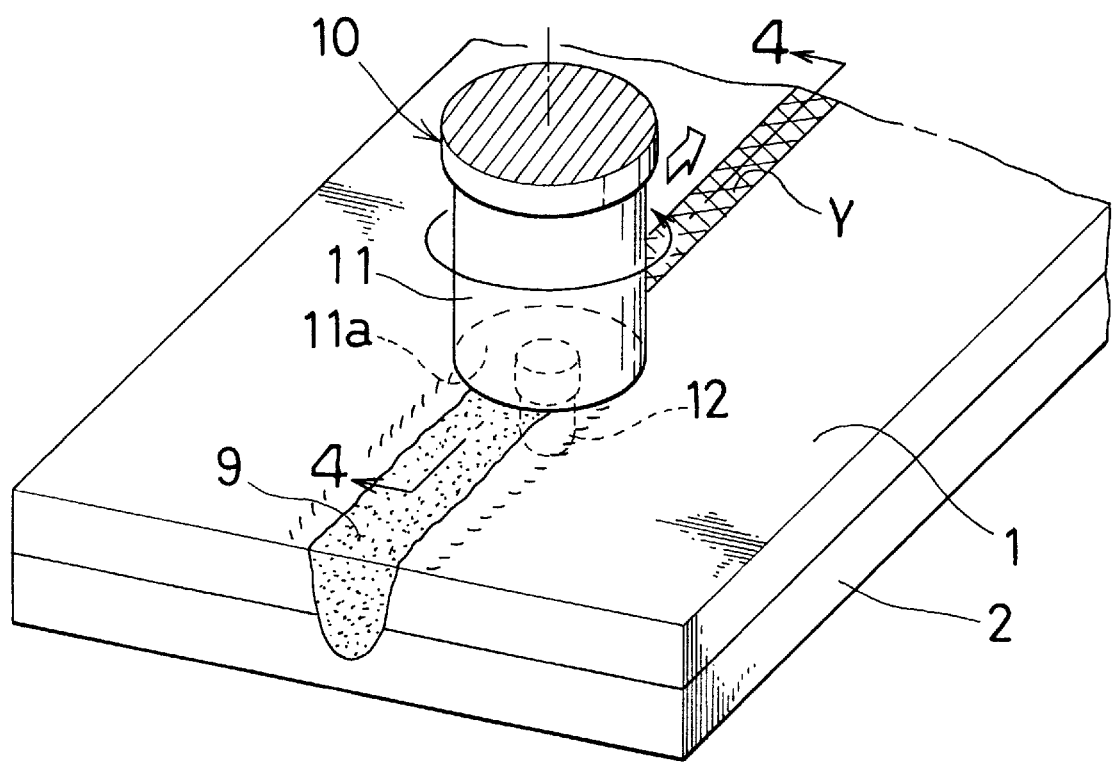
FIG. 3 is a perspective view showing the state in which stacked two joining members are being joined using the aforementioned joining tool.
Figure 4:
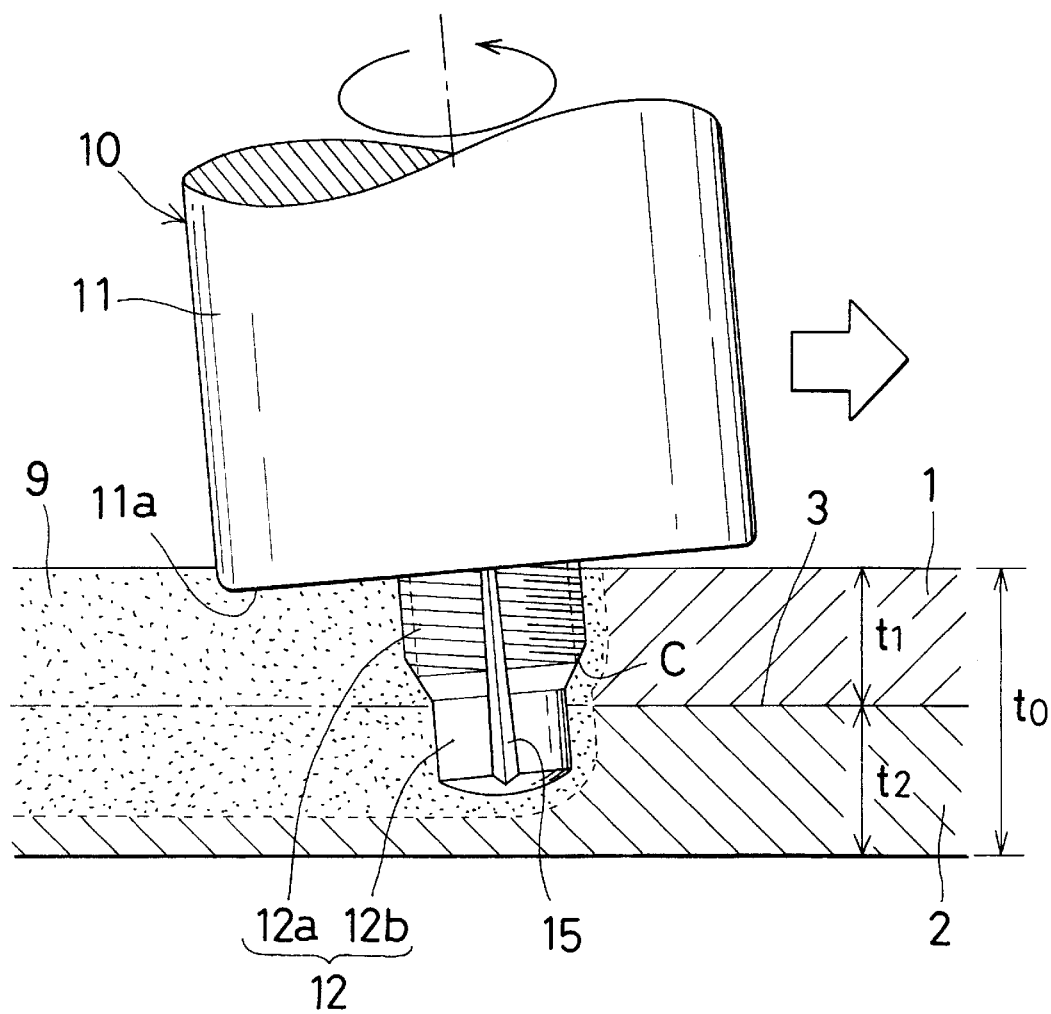
FIG. 4 is an enlarged cross-sectional view taken along the line 4—4 in FIG. 3.
Figure 5:
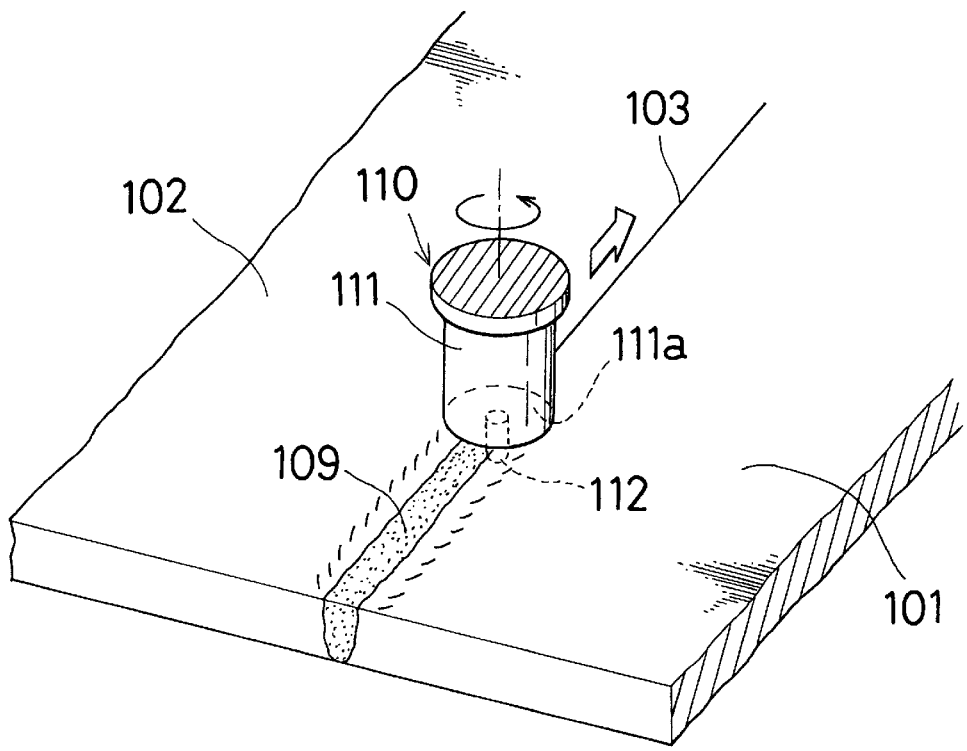
FIG. 5 is a perspective view showing the state in which stacked two joining members are being joined using a friction agitation joining tool as a related art.
Figure 6:
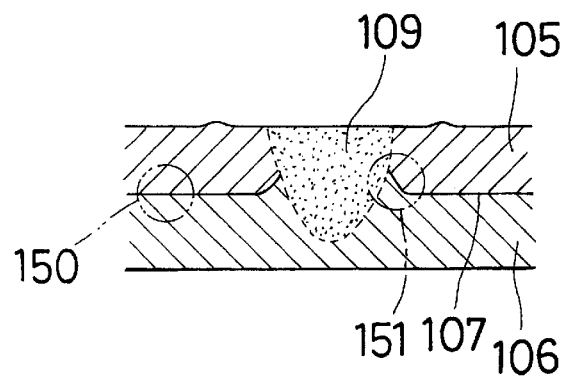
FIG. 6 is a cross-sectional view showing the state after the joining of the stacked two joining members using the friction agitation joining tool as a related art.

On the other hand, in FIG. 3 and FIG. 4, the reference numerals 1 and 2 denote two joining members to be joined by the aforementioned joining tool 10. Each joining member 1 and 2 are plate-shaped aluminum or its alloy. Both the joining members 1 and 2 are arranged one on top of the other. In these Figures, the rotating probe 12 of the joining tool 10 is inserted into both the joining members 1 and 2 from the external surface of the upper joining member 1 such that the probe 12 crosses both the joining members 1 and 2. The end face 11a of the rotor 11 is pressing the external surface of the upper joining member 1 in a rotating state. In this state, the probe 12 is moved in the predetermined direction.

In accordance with this advancing movement of this probe 12, the joining members 1 and 2 are continuously joined at the probe passing portion by the prove 12. In these figures, the reference numeral 9 denotes a joined portion of both the joining members 1 and 2. The reference letter "Y" denotes a predetermined portion to be joined. The reference numeral 3 denotes the superposed interface of both the joining members 1 and 2.

In the aforementioned joining tool 10, the rotor 11 and the probe 12 are made of heat resisting materials which are harder than the materials of both the joining members 1 and 2 and can resist against the frictional heat generated at the time of joining.

The end face 11a of the rotor 11 is formed to be depressed from the periphery edge toward the rotation central portion. Furthermore, the corner portion between the peripheral surface of the rotor 11 and the end face 11a thereof is beveled so as not to blemish the external surface of the upper joining member 1 when the corner portion contacts thereto.

The probe 12 includes a first shaft portion 12a and a second shaft portion 12b having a diameter smaller than a diameter of the first shaft portion. The first shaft portion 12a constitutes a region of from a basal end portion of the probe to a longitudinal middle portion of the probe. The second shaft portion 12b constitutes a region of from the longitudinal middle portion to a tip end portion of the probe. The first shaft portion 12a and the second shaft portion 12b are formed on the same axis. Furthermore, the peripheral surface of the first shaft portion 12a and that of the second shaft portion 12b are connected via a tapered surface.

Since this probe 12 consists of the first shaft portion 12a and the second shaft portion 12b, the portion of the joining members softened by the frictional heat will be pressed by the stepped portion C formed between the first shaft portion 12a and the second shaft portion 12b at the time of joining. Accordingly, the materials of both the joining members 1 and 2 are effectively agitated, resulting in a good joined portion 9.

Furthermore, on the peripheral surface of the first shaft portion 12a, an agitating protrusion 14 of a triangular cross-section extends in a helical manner along the entire length of the first shaft portion 12a. On the other hand, no such an agitating protrusion is provided on the peripheral surface of the second shaft portion 12b. This agitating protrusion 14 is provided so as to effectively perform an agitation mixture of the materials of both the joining members 1 and 2 softened by the frictional heat. In order to attain this purpose, it is especially preferable to-set the height of the protrusion 14 such that the height falls within the range of from 0.5 to 2 mm. In this embodiment, the screw thread of M5×0.8 is formed on the peripheral surface of the first shaft portion 12a. This screw thread constitutes an agitating protrusion 14. Furthermore, between the adjacent agitating protrusions 14 in the direction of the probe axis, a dented portion 13 of a triangular cross-section is formed so as to extend in a helical manner similar to the protrusion. The helical direction of the agitating protrusion 14 is defined so that the probe 12 advances when the probe 12 rotates in the predetermined direction (in the rotation direction 20).

The entire length L0 of this probe 12 is set so as to satisfy the following inequality:

$$t1 < L0 < t1+t2 \text{ (i.e., } t1 < L0 < t0),$$

where t1 is the thickness of the upper joining member 1, t2 is the thickness of the lower joining member 2, t0 is the total thickness of both the joining members 1 and 2 (i.e., t0=t1+t2)(see FIG. 4).

Furthermore, it is preferable to set the entire length L1 of the agitating protrusion forming portion of the probe 12 (namely, the entire length of the first shaft portion 12a) so as to satisfy the following inequality:

$$3/4 \leq L1/t1 \leq 1$$

The reason is as follows: If the value of L1 /t1 is less than 3/4, when the probe 12 is inserted into both the joining members 1 and 2, the distance between the agitating protrusion 14 and the lower joining member 2 becomes too far to agitate the materials of both the joining members 1 and 2. On the other hand, if the value of L1 /t1 exceeds 1, when the probe 12 is inserted into both the joining members 1 and 2, a part of the agitating protrusion 14 will be embedded into the lower joining member 2. Therefore, it is desirable to set L1 so as to satisfy the following inequality:

$$3/4 \leq L1/t1 \leq 1.$$

Furthermore, since the peripheral surface of the first shaft portion 12a and that of the second shaft portion 12b are connected via the tapered surface as mentioned above, the first shaft portion 12a and the agitating protrusion 14 can be inserted into the upper joining member 1 smoothly and easily. Furthermore, it is preferable that the inclination angle of the aforementioned tapered surface relative to the probe axis falls within the range of from 20 to 30°. When the inclination angle is set as mentioned above, the first shaft portion 12a and the agitating protrusion 14 can be inserted into the upper joining member 1 more smoothly and easily.

Furthermore, it is desirable to set the diameter D2 of the first shaft portion 12a so as to satisfy the following inequality:

$$0.27 \leq D2/D1 \leq 0.35,$$

where D1 is the diameter of the rotor 11. By setting the diameter D1 as mentioned above, the insertion operation of the first shaft portion 12a and the agitating protrusion 14 can be easily performed, and the pressing operation of the end surface 11a of the rotor 11 against the outer surface of the upper joining member 1 can be easily performed, resulting in a good joined portion 9. In this embodiment, D2 is set within the range of from 3.5 to 4.2 mm, and D1 is set within the range of from 12 to 13 mm.

Figure 7A:
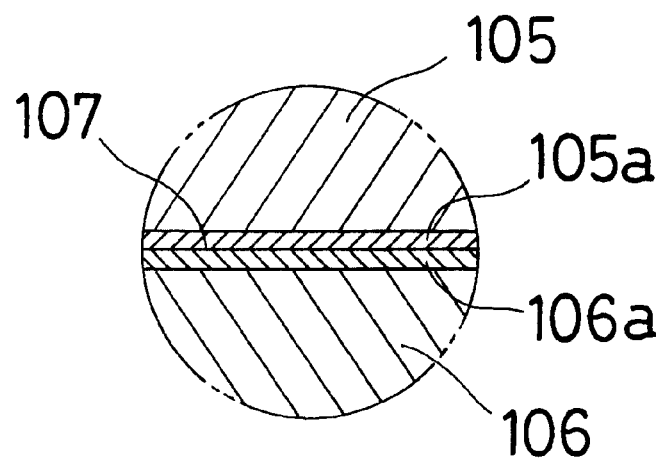
FIG. 7A is an enlarged view of the portion 150 shown in FIG. 6.
Figure 7B:
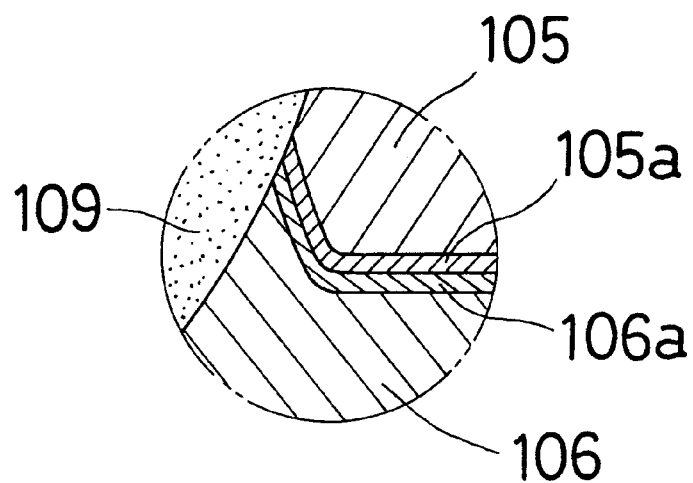
FIG. 7B is an enlarged view of the portion 151 shown in FIG. 6.

Furthermore, on the peripheral surface of the prove 12, two grooves 15 and 15 each having a triangular cross-section and extending parallel to the probe axis are formed at 180° phase difference along the entire length of the prove 12. Each groove 15 is designed so that the edge of the groove grinds the natural-oxidation film (see FIG. 7A, 105a and 106a) formed on the superposed interface of the joining members 1 and 2. In this probe 12, since the groove 15 extends parallel to the probe axis, when the probe 12 is inserted into both the joining members 1 and 2, the groove 15 can be assuredly positioned so as to perpendicularly cross the superposed interface 3 of both the joining members 1 and 2. This can ground the natural oxidation film assuredly and certainly into minute pieces by the edge of the groove 15. On the other hand, the pulverized powder of the natural oxidation film will be dispersed in the softened portion of both the joining members 1 and 2 by the rotating force of the probe 12.

Furthermore, this groove 15 is formed such that the width becomes narrow gradually in the direction of from the tip end to the basal end of the probe 12. Thus, it becomes possible to minimize the phenomenon that the materials of the joining members 1 and 2 entered in the groove 15 is conveyed outside the joining members 1 and 2 through the groove 15 during joining. This can prevent a deterioration of joining strength due to shortage of materials. Especially, it is preferable to set a width W of the groove 15 so as to satisfy the following inequality:

$$5/100 \leq (W1-W2)/(2t0) \leq 15/100,$$

where W1 is a width of one end of the groove at a tip end side of the probe, W2 is a width of the other end of the groove at a basal end side of the probe. By setting the width W, the aforementioned phenomenon can be assuredly suppressed.

Furthermore, it is preferable to set the width W of the groove 15 so as to satisfy the following inequality:

$$1/20 \leq W/D2 \leq 1/8,$$

where D2 is a diameter of said probe, and also to set the depth H of the groove 15 so as to satisfy the following inequality:

$$0.5 \leq H/W \leq 1.5,$$

where W is a width of said groove. This enables the natural-oxidation film to be completely ground into fine particles. Thus, by setting W and H as mentioned above, the natural-oxidation film can be assuredly ground minutely.

Next, the joining of the stacked joining members 1 and 2 using the aforementioned joining tool 10 will be explained as follows.

First, the rotor 11 is driven to rotate the probe 12. Then, the probe 12 is inserted into both the joining members 1 and 2 from the upper joining member 1 so as to cross both the joining members 1 and 2, and the end surface 11a of the rotor 11 is pressed onto the outer surface of the upper joining member 1. By this probe insertion operation, the groove 15 crosses the superposed interface 3 of the joining members 1 and 2 perpendicularly, and the protrusion 14 will be buried only in the upper joining member 1. Furthermore, since the peripheral surface of the first shaft portion 12a and that of the second shaft portion 12b are connected via the tapered surface, the probe 12 can be inserted smoothly and easily. Then, the rotor 11 is slightly leaned toward the direction opposite to the joining direction. In this state, the probe 12 is moved along the predetermined joining portion Y. In the meantime, needless to say, the probe 12 may be inserted into both the joining members 1 and 2 from the end surface thereof.

Then, the frictional heat generated in accordance with the rotation of the probe 12 and the frictional heat generated in accordance with the slide between the end surface 11a of the rotor 11 and the outer surface of the upper joining member 1 softens a portion of both the joining members 1 and 2 near the probe. Furthermore, the natural-oxidation film formed in the superposed interface of the joining members 1 and 2 will be ground minutely by the edge of the groove 15, and this pulverized powder will be dispersed into the softened portion of the joining members 1 and 2 softened by the frictional heat. In this state, both the joining members 1 and 2 will be agitated by the probe 12.

Since the agitating protrusion 14 is provided on the peripheral surface of the first shaft portion 12*a* of the probe 12, the agitation mixture is performed effectively. Furthermore, the softened portion of the joining members 1 and 2 is pressurized by the stepped portion C. As a result, the agitation mixture will be performed much more effectively. Furthermore, since the agitating protrusion 14 is buried only in the upper joining member 1 and is not buried in the lower joining member 2, it is prevented that materials of the lower joining member 2 is stirred up. Thus, the swelling of the outer surface of the upper joining member 1 can be decreased. On the other hand, the outer surface of the swelled upper joining member 1 will be pressed by the end surface 11*a* of the rotor 11 to be flattened. As mentioned above, since the swelled amount of the outer surface of the upper joining member 1 is decreased at this time, even if the outer surface of the upper joining member 1 is flattened, the thickness of the upper joining member 1 hardly decreases and maintains the original thickness.

While being agitated, the softened and agitated materials of the joining members 1 and 2 are plastically fluidized to go around the probe 12 and to fill up a groove formed behind the probe 12 as it moves. Then, the materials will be cooled and solidified by the immediate loss of such friction heat. This phenomenon will be repeated with the advancing movement of the probe 12, which causes the joining members 1 and 2 to be integrally joined along the probe passed portion.

In the obtained stacked joint, since the natural-oxidation film formed in the superposed interface of each joining member 1 and 2 will be ground minutely by the edge of groove 15, the standup of the natural-oxidation film near the joined portion 9 has hardly be occurred. As a result, the fatigue strength increases.

Furthermore, since the thickness of the portion near the joined portion 9 of the upper joining member 1 does not decrease, the joint is also high in strength.

Since the agitation mixture is performed effectively, a good joined portion 9 is formed and joint strength has been further increased.

As mentioned above, by joining the stacked joining members using this joining tool 10, a stacked joint having outstanding strength reliability can be obtained.

Although a preferred embodiment according to the present invention was explained above, the friction agitation joining tool according to the present invention is not limited to the aforementioned embodiment and can be modified variously.

For example, although two groove 15 are provided on the peripheral surface of the probe 12 in the aforementioned embodiment, in the present invention, one groove 15 or three or more grooves 15 may be formed. Especially, it is preferable to provide one to four grooves 15.

Furthermore, in this embodiment, although the groove 15 is provided on the peripheral surface of the probe 12 along the entire length thereof, according to the present invention, the groove 15 may be provided only in the middle portion in the direction-of the probe axis.

Furthermore, the friction agitation joining method according to the present invention is not limited the aforementioned embodiment, and may be changed in various manners.

For example, in this embodiment, the joining operation is performed by moving the probe 12 inserted in both the joining members 1 and 2. However, in the present invention, in a state that the position of the probe 12 inserted into both the joining members 1 and 2 is fixed, both the joining members 1 and 2 may be moved.

As will be apparent from the above, in cases where stacked joining is performed using the joining tool according to the first aspect of the present invention, the natural-oxidation film formed in the superposed interface of each joining member can be ground minutely by the edge of the groove, and the standup of the natural-oxidation film which may be generated near the joined portion can be suppressed. As a result, the fatigue strength of the stacked joining can be increased.

In cases where stacked joining is preformed using the joining tool according to the second aspect of the present invention, thickness reduction of joining member located at the basal end of the probe which may occur at the portion near the joined portion can be suppressed. This enhances the joint strength of the stacked joint.

In cases where stacked joining is preformed using the joining tool according to the third aspect of the present invention, the fatigue strength and the joint strength of the stacked joint can be increased.

In cases where stacked joining is preformed using the joining tool according to the fourth aspect of the present invention, the softened portion of both the joining members softened by the frictional heat can be pressurized by the step portion formed between the first shaft portion and the second shaft portion, the materials of both the joining members can be agitated effectively. This causes a good joined portion, resulting in further enhanced fatigue strength and joint strength of the stacked joint.

According to the friction agitation joining method according to the fifth aspect of the present invention, a stacked joint having excellent fatigue strength can be obtained.

According to the friction agitation joining method according to the sixth aspect of the present invention, a stacked joint having excellent fatigue strength can be obtained.

According to the friction agitation joining method according to the seventh aspect of the present invention, a stacked joint having excellent fatigue strength and stacked joint can be obtained.

According to the friction agitation joining method according to the eighth aspect of the present invention, a stacked joint having excellent fatigue strength and stacked joint can be obtained.

This application claims priority to Japanese Patent Application No. 2000-161528 filed on May 31, 2000, the disclosure of which is incorporated by reference in its entirety.

The terms and expressions which have been employed herein are used as terms of description and not of limitation, and there is no intent, in the use of such terms and expression, of excluding any of the equivalents of the features shown and described or portions thereof, but it is recognized that various modifications are possible which fall within the scope of the presently claimed invention.

What is claimed is:

1. A friction agitation joining tool, comprising:
   a rotor; and
   a probe to be inserted into joining members,
   wherein said probe has a diameter smaller than a diameter of said rotor and is provided at a part of an end surface of said rotor, and
   wherein said probe is provided with a groove formed on a peripheral surface of at least a longitudinal middle portion of said probe, said groove extending in an axial direction of said probe.

2. The friction agitation joining tool as recited in claim 1, wherein said groove is formed such that a width of said groove becomes gradually narrow toward a basal end of said probe.

3. The friction agitation joining tool as recited in claim 2, wherein a width W of said groove is set so as to satisfy the following inequality:

$$5/100 \leq (W1-W2)/(2t0) \leq 15/100,$$

where W1 is a width of one end of said groove at a tip end side of said probe, W2 is a width of the other end of said groove at a basal end side of said probe, and t0 is a total thickness of joining members.

4. The friction agitation joining tool as recited in claim 1, wherein a width W of said groove is set so as to satisfy the following inequality:

$$1/20 \leq W/D2 \leq 1/8,$$

where D2 is a diameter of said probe.

5. The friction agitation joining tool as recited in claim 1, wherein a depth H of said groove is set so as to satisfy the following inequality:

$$0.5 \leq H/W \leq 1.5,$$

where W is a width of said groove.

6. A friction agitation joining tool, comprising:

a rotor; and a probe to be inserted into joining members, wherein said probe has a diameter smaller than a diameter of said rotor and is provided at a part of an end surface of said rotor, wherein said probe is provided with a groove extending in an axial direction of said probe on a peripheral surface of at least longitudinal middle portion of said probe, and wherein said probe is provided with an agitating protrusion on a peripheral surface of said probe only in a region of from a basal end portion of said probe to a longitudinal middle portion of said probe.

7. The friction agitation joining tool as recited in claim 6, wherein said groove is formed such that a width of said groove becomes gradually narrow toward said basal end portion of said probe.

8. The friction agitation joining tool as recited in claim 7, wherein a width W of said-groove is set so as to satisfy the following inequality:

$$5/100 \leq (W1-W2)/(2t0) \leq 15/100,$$

where W1 is a width of one end of said groove at a tip end side of said probe, W2 is a width of the other end of said groove at a basal end side of said probe, and t0 is a total thickness of joining members.

9. The friction agitation joining tool as recited in claim 6, wherein a width W of said groove is set so as to satisfy the following inequality:

$$1/20 \leq W/D2 \leq 1/8,$$

where D2 is a diameter of said probe.

10. The friction agitation joining tool as recited in claim 6, wherein a depth H of said groove is set so as to satisfy the following inequality:

$$0.5 \leq H/W \leq 1.5,$$

where W is a width of said groove.

11. The friction agitation joining tool as recited in claim 6, wherein said protrusion extends in a helical fashion.

12. A friction agitation joining tool, comprising:

a rotor; and a probe to be inserted into joining members, wherein said probe has a diameter smaller than a diameter of said rotor and is provided at a part of an end surface of said rotor, wherein said probe includes a first shaft portion and a second shaft portion having a diameter smaller than a diameter of said first shaft portion, said first shaft portion constituting a region of from a basal end portion of said probe to a longitudinal middle portion of said probe, said second shaft portion constituting a region of from said longitudinal middle portion to a tip end portion of said probe, wherein said probe is provided with a groove extending in an axial direction of said probe on a peripheral surface of at least said longitudinal middle portion, and wherein said probe is provided with an agitating protrusion only on a peripheral surface of said first shaft portion.

13. The friction agitation joining tool as recited in claim 12, wherein said groove is formed such that a width of said groove becomes gradually narrow toward said basal end portion of said probe.

14. The friction agitation joining tool as recited in claim 13, wherein a width W of one end of said groove is set so as to satisfy the following inequality:

$$5/100 \leq (W1-W2)/(2t0) \leq 15/100,$$

where W1 is a width of one end of said groove at a tip end side of said probe, W2 is a width of the other end of said groove at a basal end side of said probe, and t0 is a total thickness of joining members.

15. The friction agitation joining tool as recited in claim 12, wherein a width W of said groove is set so as to satisfy the following inequality:

$$1/20 \leq W/D2 \leq 1/8,$$

where D2 is a diameter of said probe.

16. The friction agitation joining tool as recited in claim 12, wherein a depth H of said groove is set so as to satisfy the following inequality:

$$0.5 \leq H/W \leq 1.5,$$

where W is a width of said groove.

17. The friction agitation joining tool as recited in claim 12, wherein said protrusion extends in a helical fashion.

18. The friction agitation joining tool as recited in claim 12, wherein a peripheral surface of said first shaft portion and that of said second shaft portion are connected via a tapered surface.

19. The friction agitation joining tool as recited in claim 18, wherein a taper angle of said tapered surface relative to an axis of said probe falls within the range of from 20 to 30°.

20. A friction agitation joining method for joining stacked two joining members, the method including the steps of:

preparing a friction agitation joining tool comprising a rotor and a probe to be inserted into said joining members, wherein said probe has a diameter smaller than a diameter of said rotor and is provided at a part of an end surface of said rotor, wherein said probe is provided with a groove formed on a peripheral surface of at least a longitudinal middle portion of said probe, said groove extending in an axial direction of said probe;

inserting said rotating probe into said stacked two joining members such that said groove crosses a superposed interface of said joining members; and moving said rotating probe relative to said joining members with said rotating probe inserted in said joining members to thereby join said joining members.

21. A friction agitation joining method for joining stacked two joining members, the method including the steps of:

preparing a friction agitation joining tool which comprises a rotor and a probe to be inserted into joining members, wherein said probe has a diameter smaller than a diameter of said rotor and is provided at a part of an end surface of said rotor, wherein said probe is provided with a groove extending in an axial direction of said probe on a peripheral surface of at least longitudinal middle portion of said probe, and wherein said probe is provided with an agitating protrusion on a peripheral surface of said probe only in a region of from a basal end portion to a longitudinal middle portion of said probe;

inserting said rotating probe into said stacked two joining members such that said groove crosses a superposed interface of said joining members and that said protrusion is buried only in one of said joining members located at said basal end portion side of said probe; and moving said probe relative to said joining members with said rotating probe inserted in said joining members to thereby join said joining members.

22. A friction agitation joining method for joining stacked two joining members, the method including the steps of:

preparing a friction agitation joining tool which comprises a rotor and a probe to be inserted into joining members, wherein said probe has a diameter smaller than a diameter of said rotor and is provided at a part of an end surface of said rotor, wherein said probe includes a first shaft portion and a second shaft portion having a diameter smaller than a diameter of said first shaft portion, said first shaft portion constituting a region of from a basal end portion of said probe to a longitudinal middle portion of said probe, said second shaft portion constituting a region of from said longitudinal middle portion to a tip end portion of said probe, wherein said probe is provided with a groove extending in an axial direction of said probe on a peripheral surface of at least said longitudinal middle portion, and wherein said probe is provided with an agitating protrusion only on a peripheral surface of said first shaft portion;

inserting said rotating probe into said stacked two joining members such that said groove crosses a superposed interface of said joining members and that said protrusion is buried only in one of said joining members located at said basal end portion side of said probe; and moving said probe relative to said joining members with said rotating probe inserted in said joining members to thereby join said joining members.

* * * * *